United States Patent Office 3,790,486
Patented Feb. 5, 1974

3,790,486
THERMAL CATALYTIC CHEMICAL REACTION
OF NON-NEWTONIAN FLUIDS
Alvin R. Saltzman, Bradley Beach, N.J., and Bruno T.
Plizak, Philadelphia, Pa., assignors to the United States
of America as represented by the Secretary of the Navy
No Drawing. Filed Oct. 28, 1971, Ser. No. 193,549
Int. Cl. C09k 3/02
U.S. Cl. 252—77                                       5 Claims

ABSTRACT OF THE DISCLOSURE

Non-Newtonian fluids suitable for use as a coolant comprise various types of collagen reactant materials prepared in aqueous solution with catalytic materials. The fluids exhibit thermal catalytic chemical reaction when subjected to heat. The fluids in addition have a viscosity which is time dependent and subject to change without the necessity of heat.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a coolant and more particularly to a coolant exhibiting endothermic heat transfer characteristics and a time dependent viscosity.

Well known methods of cooling generally utilize one or a combination of the three basic modes of heat transfer, i.e., radiation, conduction and convection. For liquid cooling, water is an excellent coolant but its freezing-expansion characteristic has been a major limitation to its overall desired usage. Other conventional cooling techniques have had limitations due to heat load handling capacity, complexity and poor thermal control of temperature sensitive component parts.

SUMMARY OF THE INVENTION

It is therefore a general purpose of the present invention to provide an improved coolant for use in a cooling system. Further objects are that the coolant can provide superior control of the temperature in coolant systems of electronic components or other heat sources. Other objects are that the coolant is economical in cost, does not exhibit a freeze-expansion characteristic and that only a small amount of fluid is necessary. This lessens the weight of coolant systems utilizing the coolant.

This is accomplished by utilizing non-Newtonian collagen protein aqueous solutions. These collagen solutions have a time dependent viscosity and, in addition, provide endothermic chemical reaction when subjected to heat. The endothermic reaction aids the solution in providing an efficient means of heat removal. The aqueous solutions suitable for use comprise various catalytic materials in addition to collagen and water.

DESCRIPTION OF THE PREFERRED EMBODIMENT

Solutions of collagen normally have a high viscosity and a tendency of molecules to aggregate. However, once extracted and purified, collagen preparations have very similar properties, independent of the manner in which they are extracted. Well known salt and acid extraction methods of obtaining collagen are presently in existence.

Collagen aqueous solutions, particularly those in concentrations over 20 parts by weight of collagen, are of a non-Newtonian nature. The sample coolant solutions shown in Examples 1–4, inclusive, were non-Newtonian and showed highly efficient heat removal capabilities.

In accordance with the present invention these coolants were prepared by taking aqueous solutions of collagens of specific molecular weights and mixing them with various types of catalytic materials. These materials included various aqueous solutions of NaOH, an aqueous mixture of pepsin, trypsin and urease, and HCl. Results of subjecting these coolants to heat over a period of time showed both a lowering of viscosity and endothermic reactions taking place. Tests further showed that changes in viscosity were time dependent even without the addition of heat.

The fluids were tested in a closed loop by passing them through a heat controlled reactor consisting of a 1-inch inner diameter copper tube. Heat was removed from the system by a liquid to liquid heat exchanger although obviously any type of heat exchanger suitable to a closed loop and of sufficient capacity could be used.

In the following Examples 1–4, inclusive, the term "parts" signifies parts by weight.

Example 1

For reading A, in the following table, 11,500 grams of an aqueous collagen solution of 15 parts dry granular collagen type protein of the molecular weight of 40,000 and 85 parts water were mixed. For reading B, 1,150 grams of a 20 percent aqueous NaOH solution were added resulting in 88.25 parts by weight of collagen in the collagen-NaOH combination, and 84.55 parts by weight of water in the total solution. For reading C, heat was added.

Example 2

Mix 12,655 grams of the aqueous collagen solution of Example 1 with 1,760 grams of a 20 percent aqueous NaOH solution resulting in 84.35 parts by weight of collagen in the collagen-NaOH combination, and 84.39 parts by weight of water in the total solution.

Example 3

For reading A, a mixture of 10,800 grams of the aqueous collagen solution of Example 1 was prepared. For reading B, 20 grams of trypsin, 20 grams of pepsin, and 5 grams of urease were mixed with 500 grams of water and added to the aqueous collagen solution, resulting in 97.30 parts by weight of the collagen in the collagen-pepsin/trypsin/urease combination, and 85.32 parts by weight of water in the total solution. For reading C, heat was added and the flow rate reduced. For reading D, 1,400 grams of 40 percent aqueous NaOH solution were added resulting in 72.81 parts by weight of the collagen in the collagen-NaOH/pepsin/trypsin/urease combination, and 82.54 parts by weight of water in the total solution.

Example 4

For reading A, 12,000 grams of an aqueous collagen solution of 15 parts of dry granular collagen type protein of a molecular weight of 10,000 and 85 parts of water were mixed. An aqueous solution of 1,000 grams of 10 percent NaOH was added resulting in 94.74 parts by weight of the collagen in the collagen-NaOH combination, and 85.38 parts by weight of water in the total solution. For reading B, 250 cc. of HCl with a pH of 3.15 were added.

Test results are shown in the table following. Of particular significance are the sixth and seventh columns, respectively showing the calculated specific heat ($C_p$) of the particular coolant solution and the percentage heat loss representing endothermic chemical reaction.

TABLE

| Example | Reading | Reactor heat input (watts) | Reactor inlet temp., °C. | Reactor outlet temp., °C. | Reactor fluid Cp-calc. B.t.u./lb. °F. | Heat loss, percent | Reactor fluid flow, lbs./min. |
|---|---|---|---|---|---|---|---|
| 1 | A | 1,871 | 29 | 60 | 0.439 | +3.2 | 4.34 |
|   | B | 1,874 | 30 | 42 | 0.969 | 0 | 5.09 |
|   | C | 2,148 | 72 | 86 | 1.380 | −35.7 | 3.51 |
| 2 | A | 2,256 | 66 | 91 | 1.140 | −31.9 | 2.50 |
| 3 | A | 1,470 | 36 | 59 | 0.474 | 0 | 4.26 |
|   | B | 1,469 | 37 | 46 | 0.557 | 0 | 9.26 |
|   | C | 2,263 | 73.5 | 100 | 1.041 | −39.6 | 2.59 |
|   | D | 2,253 | 74.5 | 95 | 0.885 | −31.7 | 3.92 |
| 4 | A | 2,239 | 72 | 95 | 0.737 | −37.0 | 4.17 |
|   | B | 2,218 | 78 | 94 | 0.806 | −40.6 | 5.43 |

In Readings A of both Examples 1 and 3, a stabilization of temperature was made and the readings taken prior to adding the catalysts to the chemical solution. During this time interval the chemical solution was circulated in the reactor and heated to operational stabilization temperature by heating the exterior surface of the reactor. Readings B in both Examples 1 and 3 were taken after chemical catalysts were added to the reactant solution. In Example 1 the catalyst was NaOH and in Example 3 trypsin, pepsin and urease were added. Reading C, Example 1, and Readings C and D in Example 3 were taken after endothermic chemical reaction caused by additional heat to the outside of the reactor tube. On removal of heat from the solution by suitable heat exchangers, energy balances were made and the percent heat loss appears directly attributable to endothermic reaction. This establishes the amount of heat energy being absorbed by the reacting chemical solution.

With regard to Reading B in Examples 1 and 3 it is to be noted that the outlet temperature dropped a substantial amount compared to that in Reading A. This occurred during a time period of less than 12 minutes. It is very possible that some chemical reaction was occurring and changing physical properties. However, from the close correlation of energy balance shown as a 0 percent heat loss, it has to be concluded that physical time dependent properties of non-Newtonian fluids such as viscosity accounted for the favorable temperature reduction, whereas the overall heat of reaction played a minor role.

Non-Newtonian fluids are known to differ from Newtonian types in that their shear stress values are not proportional to the rate of shear strain. Additionally, non-Newtonian fluids viscosities are a variable, being time dependent and behaving in a much different manner than conventional Newtonian fluids. The results demonstrate that this unconventional behavior can be utilized to advantage for providing to cooling systems a temperature reduction or other physical property change as a function of time.

A further advantage of a cooling system using the collagen and catalytic materials described is that an endothermic chemical reaction takes place to remove sensible heat from the system. In addition the temperature of the solution can be taken below that of water as the fluid does not experience the freeze expansion characteristic detrimental to the use of water as a coolant and a $C_p$ greater than that of water was experienced with a number of such solutions.

Obviously many modifications and variations of the present invention are possible in the light of the above teachings. It is therefore to be understood that within the scope of the appended claims the invention may be practiced otherwise than as specifically described.

What is claimed is:

1. A method for producing an aqueous coolant solution comprising the steps of:
   combining a granular collagen of a molecular weight of 40,000 with a mixture of pepsin, trypsin and urease, said collagen comprising 97.30 parts by weight per one hundred parts of the combination of said collagen and said mixture, and said mixture being 44.44 parts by weight per one hundred parts of said pepsin, 44.44 parts by weight per one hundred parts of said trypsin, and 11.12 parts by weight per one hundred parts of said urease; and
   adding water of 85.32 parts by weight per one hundred parts of the solution.

2. A method for producing an aqueous coolant solution comprising the steps of:
   combining a granular collagen of a molecular weight of 40,000 with a mixture of NaOH and a first mixture of pepsin, trypsin and urease, said collagen comprising 72.81 parts by weight per 100 parts of the combination of said collagen and said mixture and said first mixture being 44.44 parts by weight per one hundred parts of said pepsin, 44.44 parts by weight per one hundred parts of said trypsin, and 11.12 parts by weight per one hundred parts of said urease;
   and adding a quantity of water of 82.54 parts by weight per one hundred parts of the solution.

3. A method of cooling comprising the step of circulating through a heat exchanger an aqueous solution consisting essentially of:
   collagen of an initial granular structure with a molecular weight from 10,000 to 40,000;
   NaOH, said collagen being from 84.35 to 94.74 parts by weight per one hundred parts of the combination of said collagen and said NaOH; and
   a quantity of water from 84.39 to 85.38 parts by weight per one hundred parts of the solution.

4. A method of cooling comprising the step of circulating through a heat exchanger an aqueous solution consisting essentially of:
   collagen of an initial granular structure with a molecular weight of 40,000;
   a mixture of pepsin, trypsin and urease, said collagen comprising 97.30 parts by weight per one hundred parts of the combination of said collagen and said mixture, and said mixture being 44.44 parts by weight per one hundred parts of said pepsin, 44.44 parts by weight per one hundred parts of said trypsin, and 11.12 parts by weight per one hundred parts of said urease; and
   a quantity of water being 85.32 parts by weight per one hundred parts of the solution.

5. A method of cooling comprising the step of circulating through a heat exchanger an aqueous solution consisting essentially of:
   collagen of an initial granular structure with a molecular weight of 40,000;
   a mixture of NaOH and a first mixture of pepsin, trypsin, and urease, said collagen comprising 72.81 parts by weight per one hundred parts of the combination of said collagen and said mixture, and said first mixture being 44.44 parts by weight per one hundred parts of said pipsin, 44.44 parts by weight per one hundred parts of said trypsin, and 11.12 parts by weight per one hundred parts of said urease; and a quantity of water of 82.54 parts by weight per one hundred parts of the solution.

References Cited

UNITED STATES PATENTS

| | | | |
|---|---|---|---|
| 2,212,750 | 8/1940 | Pfannmuller et al. | 195—6 |
| 3,034,852 | 5/1962 | Nishihara | 260—123 X |
| 3,121,049 | 2/1964 | Nishihara | 195—6 |
| 3,293,237 | 12/1966 | Wiegand | 260—123.7 |
| 3,314,861 | 4/1967 | Fujii | 195—6 |
| 3,579,358 | 5/1971 | Courts | 260—123.7 X |
| 3,637,642 | 1/1972 | Fujii | 260—123.7 X |
| 3,684,732 | 8/1972 | Grabauskas | 260—123.7 X |

MAYER WEINBLATT, Primary Examiner

H. A. PITLICK, Assistant Examiner

U.S. Cl. X.R.

252—67, 73